US012233809B1

(12) United States Patent
 Williams

(10) Patent No.: US 12,233,809 B1
(45) Date of Patent: Feb. 25, 2025

(54) AIRBAG ASPIRATION MODULES WITH OUTER CUSHION COUPLING

(71) Applicant: Autoliv ASP, Inc., Ogden, UT (US)

(72) Inventor: J D Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 18/582,539

(22) Filed: Feb. 20, 2024

(51) Int. Cl.
 *B60R 21/30* (2006.01)
 *B60R 21/205* (2011.01)
 *B60R 21/217* (2011.01)

(52) U.S. Cl.
 CPC .......... *B60R 21/217* (2013.01); *B60R 21/205* (2013.01); *B60R 21/30* (2013.01)

(58) Field of Classification Search
 CPC . B60R 21/237; B60R 21/2176; B60R 21/207; B60R 21/30; B60R 21/205; B60R 21/217
 See application file for complete search history.

(56) References Cited

U.S. PATENT DOCUMENTS

| | | | | |
|---|---|---|---|---|
| 5,470,105 A * | 11/1995 | Rose | ............ | B60R 21/261 280/740 |
| 5,605,347 A * | 2/1997 | Karlow | ............ | B60R 21/2171 248/99 |
| 5,615,907 A * | 4/1997 | Stanger | ............ | B60R 21/217 280/728.2 |
| 5,681,055 A * | 10/1997 | Green | ............ | B60R 21/2171 280/736 |
| 5,873,598 A * | 2/1999 | Yoshioka | ............ | B60R 21/2171 280/740 |
| 6,142,516 A * | 11/2000 | O'Loughlin | ............ | B60R 21/30 280/737 |
| 6,325,407 B1 * | 12/2001 | Soderquist | ............ | B60R 21/217 280/728.2 |
| 6,371,517 B1 * | 4/2002 | Webber | ............ | B60R 21/2338 280/736 |
| 6,851,703 B2 * | 2/2005 | Dahmen | ............ | B60R 21/2171 280/740 |
| 7,011,336 B2 * | 3/2006 | Sommer | ............ | B60R 21/261 280/740 |
| 7,150,467 B2 * | 12/2006 | Bayer | ............ | B60R 21/2171 280/728.2 |

(Continued)

FOREIGN PATENT DOCUMENTS

| | | | | |
|---|---|---|---|---|
| JP | 2016164043 A | * | 9/2016 | ........... B60R 21/217 |
| KR | 20130059940 A | * | 6/2013 | |

(Continued)

*Primary Examiner* — Paul N Dickson
*Assistant Examiner* — Maxwell L Meshaka
(74) *Attorney, Agent, or Firm* — Matthew D. Thayne; Thayne and Davis LLC

(57) ABSTRACT

Airbag cushion modules for aspirating ambient air and related assemblies. Some embodiments may comprise an aspirating airbag cushion assembly comprising a housing comprising an inner portion and an outer portion and an inflator fluidly coupled with the inner portion of the housing. An airbag cushion may be stored in the housing, which airbag cushion may be configured to extend from the inner portion to the outer portion such that a peripheral edge of the airbag cushion, such as a portion of the throat region of the cushion, is coupled with the housing along the outer portion.

17 Claims, 6 Drawing Sheets

(56) References Cited

U.S. PATENT DOCUMENTS

| | | | |
|---|---|---|---|
| 7,234,724 B1 * | 6/2007 | Cowelchuk | B60R 21/217 |
| | | | 280/728.2 |
| 7,938,444 B2 * | 5/2011 | Williams | B60R 21/2338 |
| | | | 280/739 |
| 7,942,442 B2 * | 5/2011 | Rose | B60R 21/237 |
| | | | 280/743.1 |
| 9,376,082 B2 * | 6/2016 | Osterfeld | B60R 21/2176 |
| 9,669,792 B2 * | 6/2017 | Miura | B60R 21/217 |
| 9,718,430 B2 * | 8/2017 | Miura | B60R 21/215 |
| 10,124,759 B2 * | 11/2018 | Smith | C06D 5/02 |
| 10,913,423 B2 * | 2/2021 | Williams | B60R 21/26 |
| 10,988,104 B2 * | 4/2021 | Williams | B60R 21/264 |
| 11,104,293 B2 * | 8/2021 | Itakura | B60R 21/237 |
| 11,613,225 B2 * | 3/2023 | Williams | B60R 21/2338 |
| | | | 280/743.2 |
| 11,794,685 B2 * | 10/2023 | Williams | B60R 21/217 |
| 2003/0155756 A1 * | 8/2003 | Hawthorn | B60R 21/239 |
| | | | 280/739 |
| 2006/0202452 A1 * | 9/2006 | Breed | B60R 21/264 |
| | | | 280/730.2 |
| 2006/0273558 A1 * | 12/2006 | Breed | B60R 21/206 |
| | | | 280/730.2 |
| 2008/0048421 A1 * | 2/2008 | Breed | B60R 21/30 |
| | | | 280/735 |
| 2009/0039625 A1 * | 2/2009 | Breed | B60R 21/235 |
| | | | 280/729 |
| 2009/0102173 A1 * | 4/2009 | Rose | B60R 21/237 |
| | | | 280/743.1 |
| 2009/0108574 A1 * | 4/2009 | Lachat | B60R 21/237 |
| | | | 280/743.1 |
| 2010/0090445 A1 * | 4/2010 | Williams | B60R 21/2338 |
| | | | 280/743.2 |
| 2015/0021886 A1 * | 1/2015 | Osterfeld | B60R 21/2176 |
| | | | 280/728.3 |
| 2016/0257275 A1 * | 9/2016 | Miura | B60R 21/217 |
| 2016/0257277 A1 * | 9/2016 | Miura | B60R 21/215 |
| 2018/0079384 A1 * | 3/2018 | Smith | C06D 5/02 |
| 2019/0126887 A1 * | 5/2019 | Williams | B60R 21/36 |
| 2020/0101933 A1 * | 4/2020 | Williams | B60R 21/26 |
| 2022/0227324 A1 * | 7/2022 | Williams | B60R 21/231 |
| 2023/0137368 A1 * | 5/2023 | Williams | B60R 21/26 |
| | | | 280/740 |
| 2023/0331184 A1 * | 10/2023 | Williams | B60R 21/217 |
| 2023/0398957 A1 * | 12/2023 | Williams | B60R 21/2171 |

FOREIGN PATENT DOCUMENTS

| | | | | |
|---|---|---|---|---|
| WO | WO-2007005092 A2 * | 1/2007 | | B60R 21/217 |
| WO | WO-2007061822 A2 * | 5/2007 | | B60R 21/217 |

* cited by examiner

AIRBAG ASPIRATION MODULES WITH OUTER CUSHION COUPLING

SUMMARY

Various improvements in vehicle technologies, such as autonomous vehicles, may require changes in the way airbag assemblies operate. For example, in some autonomous vehicles, or other newer vehicles, larger airbags may be used. This may be needed, for example, due to a larger distance between the airbag module and the vehicle occupant. In some systems, it is even contemplated that a single cushion may be used to provide protection to multiple occupants.

However, existing aspirating airbag assemblies suffer from many drawbacks, such as having airbag cushion attachment features inside the cushion housing that impede the aspiration function of the module. In addition, there is a push towards making the width of aspirating modules narrower, but current module designs make this difficult.

The present inventors have therefore determined that it would be desirable to provide systems and methods that overcome one or more of the foregoing limitations and/or other limitations of the prior art. In some embodiments, the inventive concepts disclosed herein may allow for providing an assembly that improves aspiration efficiency, eliminates or at least reduces aspiration flow, and/or allows for reduction in width and/or size of the module, preferably without sacrificing aspiration efficiency.

For example, in some embodiments, a portion of the module and/or assembly, such as the airbag housing, may be configured to fixedly couple the airbag cushion from the outside. In some cases, protruding coupling members, such as hooks, may be provided on an outer surface of the housing. In other cases, other means for coupling the cushion outside of the housing may be provided. Preferably, the coupling means are removed from the interior of the housing—where the aspiration airflow might be impeded—to the outside, such as an exterior surface about the perimeter of the housing, to improve efficiency and/or allow for reduction in width and/or size.

In a more specific example of an aspirating airbag cushion assembly according to some embodiments, the assembly may comprise an airbag cushion and an inflator configured to draw ambient air into the airbag cushion upon deployment. The assembly may further comprise a housing configured to receive the airbag cushion therein. The housing may be configured to allow for receipt of ambient air into the airbag cushion during inflation of the airbag cushion and may further comprise a plurality of coupling features protruding from an outer surface of the housing. A portion of the airbag cushion, such as a throat region of the cushion, may be configured to extend to the outer surface of the housing and couple with the plurality of coupling features.

In some embodiments, the plurality of coupling features may comprise coupling hooks or other projecting members. In some such embodiments, the coupling hooks may be configured to serve another purpose, such as to facilitate coupling of the housing to a vehicle instrument panel. This may allow pre-existing features of a module to be used as cushion coupling features as well.

In some embodiments, the housing may comprise an elongated length defined by opposing sides of the housing and a width measured between the opposing sides of the housing. In some such embodiments, the width may be no greater than 100 mm, or more preferably no greater than about 85 mm.

In some embodiments, the housing may comprise a length defined by opposing sides of the housing and a width measured between the opposing sides of the housing, wherein the coupling features are formed along upper ends of both of the opposing sides of the housing. In some such embodiments, the coupling features may also be formed along at least one, or in some cases both, of a pair of opposing ends of the housing. At least one of the opposing ends may define the width of the housing.

In another example of an airbag cushion assembly according to some embodiments, the assembly may comprise a housing comprising an inner portion and an outer portion, and an inflator fluidly coupled with the inner portion of the housing. An airbag cushion may be stored in the housing such that the airbag cushion extends from the inner portion to the outer portion. A peripheral edge of the airbag cushion, such as a throat region of the airbag cushion, may be coupled with the housing along the outer portion.

In some embodiments, the airbag cushion assembly may comprise an aspirating airbag cushion assembly. The housing may therefore be configured to allow for receipt of ambient air into the airbag cushion during inflation of the airbag cushion.

In some embodiments, the housing may comprise opposing sidewalls defining an elongated length and opposing end walls, at least one of which may define a width measured between the opposing sidewalls of the housing. In some such embodiments, the inflator may be coupled to one of the opposing end walls, such as by way of a threaded cap inserted into an inflator hub in some cases.

In some embodiments, the width of the housing may be less than 100 mm, or more preferably no greater than about 85 mm.

In some embodiments, the housing may comprise a plurality of protruding coupling members. In some such embodiments, the peripheral edge of the airbag cushion may be coupled with the plurality of protruding coupling members. In some embodiments, the airbag cushion may comprise a plurality of slits or other openings configured to receive the plurality of protruding coupling members. In some embodiments, the plurality of protruding coupling members comprises coupling hooks. In some such embodiments, the airbag cushion may comprise a plurality of slits or other openings configured to receive the plurality of coupling hooks.

Some embodiments may further comprise a wrapper extending along an upper side of the housing between the opposing sidewalls, which may enclose the airbag cushion within the housing. In some such embodiments, the wrapper may be coupled with the plurality of protruding coupling members. For example, in some embodiments, the wrapper may comprise a plurality of slits and/or other openings to receive the plurality of protruding coupling members.

In another example of an aspirating airbag cushion assembly according to some embodiments, the assembly may comprise a housing comprising an inner portion and an outer portion. A plurality of hooks may extend along the outer portion, which hooks may be configured to facilitate coupling of the housing within a vehicle. An inflator may be fluidly coupled with the inner portion of the housing and an airbag cushion may be stored in the housing. The housing may be configured to allow for receipt of ambient air into the airbag cushion during inflation of the airbag cushion. The airbag cushion may extend from the inner portion to the outer portion such that a peripheral edge of the airbag cushion is coupled with the plurality of hooks to retain the cushion to the housing, preferably both before, during, and after deployment.

In some embodiments, the housing may comprise a width extending between opposing sides of the housing. In some embodiments, the width may be no more than about 85 mm.

In some embodiments, each of at least a subset of the plurality of hooks may extend along upper edges of opposing sides of the outer portion. In some cases, at least some of the plurality of hooks may extend along at least one side, or in some cases both sides, of the housing extending between the opposing sides.

In some embodiments, the airbag cushion may comprise a plurality of openings, such as slits or slots, configured to receive the plurality of hooks therethrough.

Some embodiments may further comprise a wrapper that may extend along an upper side of the housing. In some such embodiments, the wrapper may be coupled with the plurality of hooks and/or the wrapper may comprise a tear seam to allow the airbag cushion to deploy therethrough.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
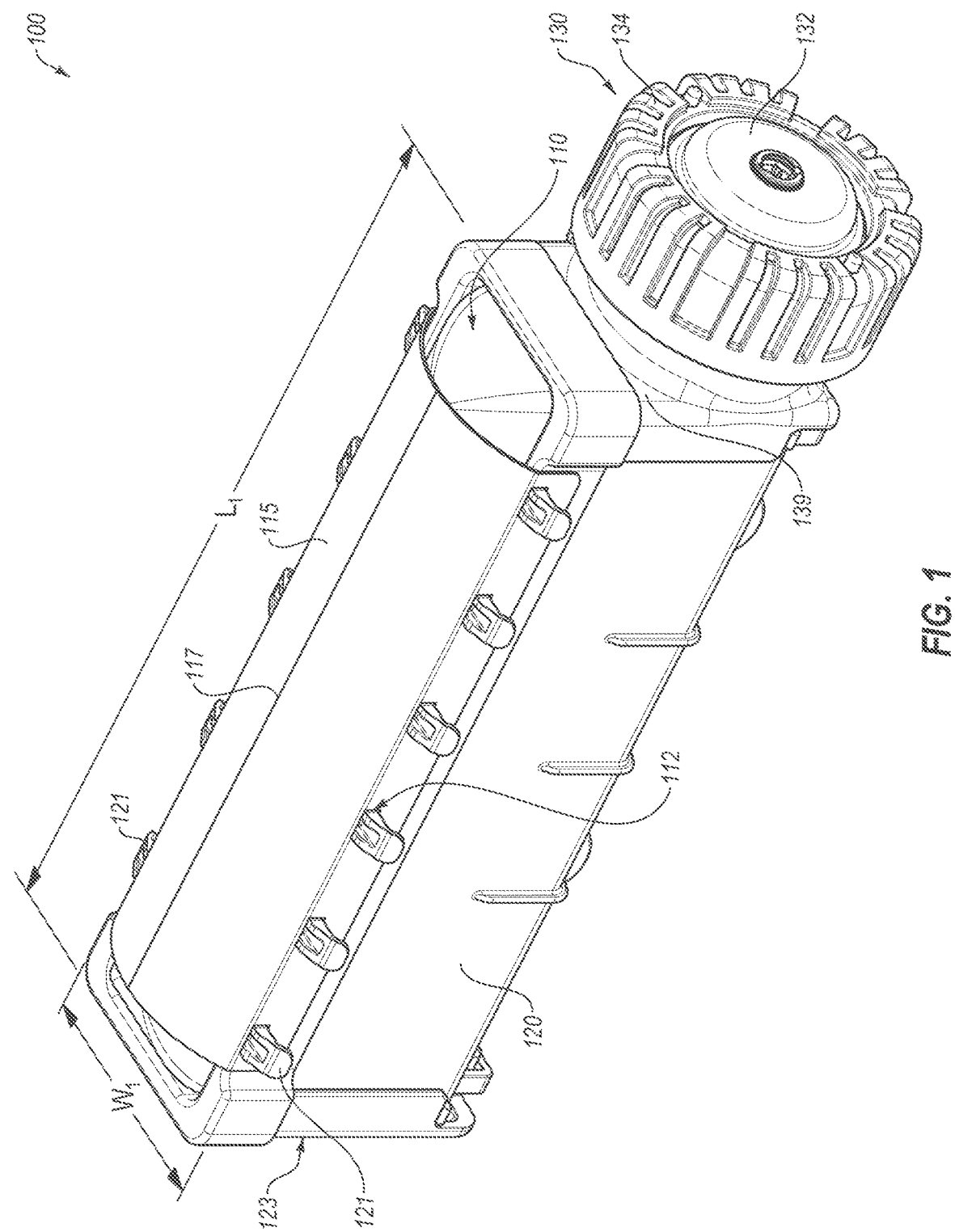
FIG. 1 is a perspective view of an aspirating airbag assembly according to some embodiments.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

Apparatus, methods, and systems are disclosed herein relating to aspirating airbag cushion assemblies configured to utilize ambient air, in some cases along with inflation gas, to inflate larger airbag cushions, such as, in some embodiments, airbag cushions for multiple occupants, airbag cushions for autonomous vehicles, or pedestrian airbag cushions. Various embodiments disclosed herein may provide unique features to improve aspiration, such as provision of airbag cushion coupling on the exterior of the housing or another exterior portion of the module.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts an aspirating airbag cushion assembly 100. Aspirating airbag cushion assembly 100 comprises an airbag cushion 110 coupled with an aspiration housing 120 so as to allow the cushion 110 to deploy therefrom. The aspiration housing 120 comprises an open upper end for receiving airbag cushion 110. Opposite this open upper end, aspiration housing 120 comprises an aspiration inlet along the bottom that is configured to allow for receipt of ambient air into the airbag cushion during inflation. As shown in later figures, this aspiration inlet may comprise one or more openings to allow for aspiration of this ambient air, which, as also discussed below, may be entrained with inflation gas from an inflator to supplement inflation of the cushion 110.

In some embodiments, the aspiration inlet may comprise a plurality of openings aligned in a grid pattern along this lower side of aspiration housing 120. These openings may, in some cases, be defined by cross-members and/or inflation conduits, such as inflation conduits 140 shown in connection with later figures. However, it is contemplated that, in alternative embodiments, the aspiration inlet may comprise a single opening (in some such embodiments, the entire lower side of aspiration housing 120 may be open) or may comprise any other suitable number of openings as desired.

Aspiration housing 120 comprises one or more features that facilitate coupling with the airbag cushion 110 along an exterior surface of the housing 120. In the depicted embodiment, these features comprise protruding coupling members 121. In preferred embodiments, these protruding coupling members comprise hooks 121, which may comprise hooks that are used to couple the assembly/module 100 within a vehicle. For example, in some embodiments, hooks 121 may be used to couple the assembly/module 100 to a vehicle instrument panel and may therefore be used for two purposes.

In the depicted embodiment, hooks 121 are also used to couple a peripheral edge of the airbag cushion 110 to an outer surface and/or portion of the aspiration housing 120 such that the airbag cushion 110 extends from an inner portion of the aspiration housing 120 to the outer portion and/or surface with a peripheral edge of the airbag cushion 110 being coupled with the housing 120 along the outer portion and/or surface.

To facilitate this coupling, in the depicted embodiment, a plurality of slits and/or openings 112 (see FIG. 2) may be formed along a peripheral edge of the airbag cushion 110. This allows hooks 121 or other protruding coupling members to extend therethrough and allow the airbag cushion 110 to be fixedly coupled with the exterior portion and/or surface of the aspiration housing 120. Thus, hooks 121 are an example of a means for coupling an airbag cushion to an exterior surface, and/or an exterior portion, of an airbag housing and/or module.

A wide variety of alternative coupling members, coupling features, and/or other means for coupling airbag cushion 110 to an outer portion of airbag housing 120 are contemplated and/or would be apparent to those of ordinary skill in the art after having received the benefit of this disclosure. For example, in some embodiments, rather than curved hooks 121, non-curved protruding coupling members, such as tabs, plates, spikes, bolts, studs, screws, or the like may be used. Such members may, or may not, also be used to couple the housing/module within a structure of a vehicle, such as within a vehicle instrument panel. In other embodiments, non-protruding coupling features may be used, such as slots, openings, recesses, adhesives, and the like, may be used. Each of these should also be considered examples of means for coupling an airbag cushion to an exterior surface, and/or an exterior portion, of an airbag housing and/or module.

By attaching the cushion 110, such as a throat region of the cushion 110, to the outside and/or exterior of the housing 120, the efficiency of the aspiration function of the module 100 may be improved. Thus, preferred embodiments of the inventions disclosed herein may be characterized in that the inside of the housing containing the airbag cushion is devoid of any protruding airbag coupling members and/or features. In some such embodiments, the inside of the housing containing the airbag cushion is devoid of any airbag cushion coupling features altogether.

Figure 2:
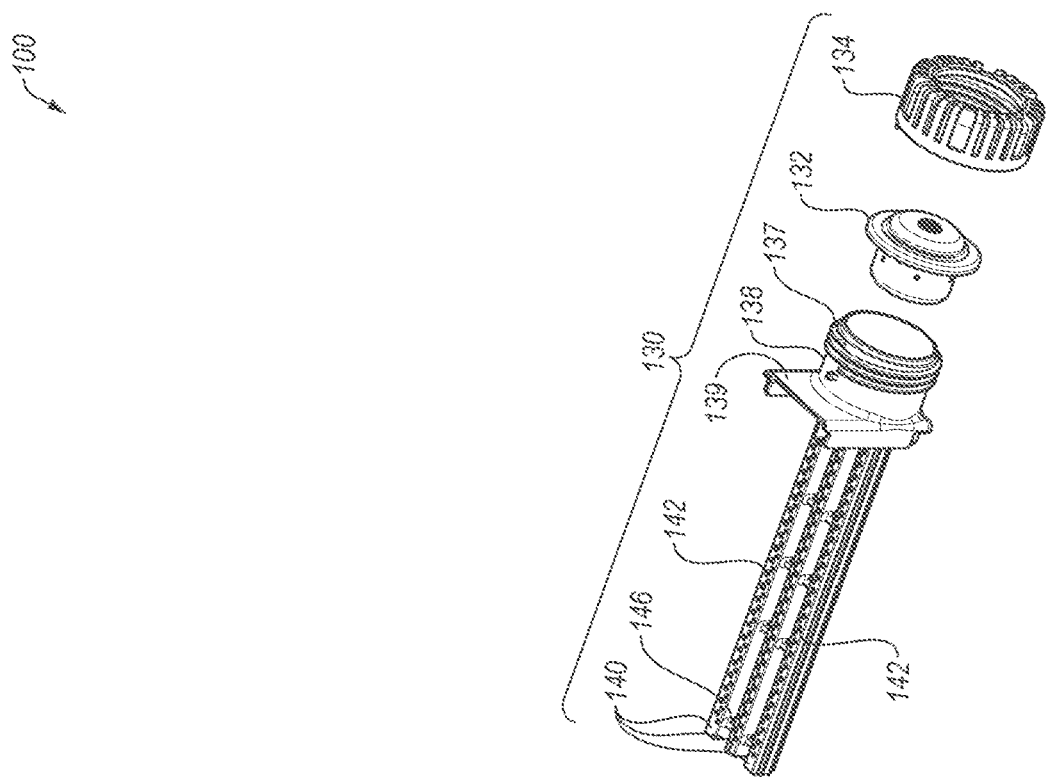
FIG. 2 is an exploded view of the aspirating airbag assembly of FIG. 1.
Figure 2:
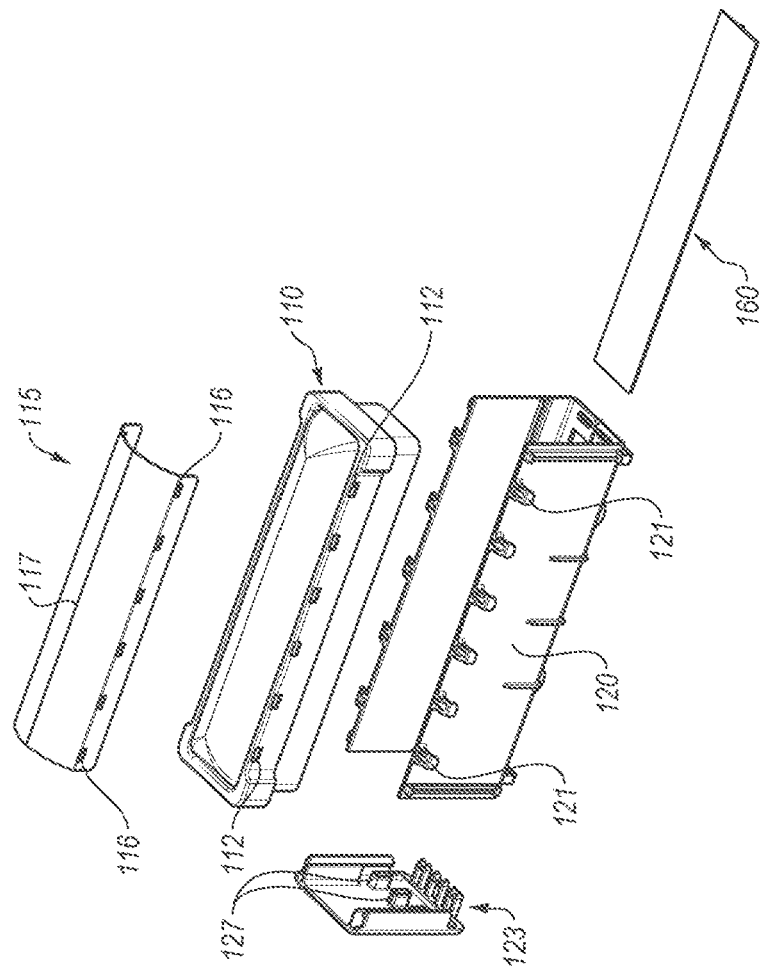

In the depicted embodiment, a wrapper 115 may be coupled with housing 120 to enclose the airbag cushion 110 thereunder. In some embodiments, wrapper 115 may comprise a tear seam 117 or other weakened portion to allow the airbag cushion 110 to deploy therethrough. In addition, as shown in FIG. 2, a series of slits 116 or other openings similar to slits 112 may be formed in wrapper 115 to allow wrapper 115 to be secured to the housing 120 and to enclose the cushion 110 therein.

Various components may be coupled with housing 120 to complete the assembly/module 100. For example, an endplate 123 may be coupled with housing 120 at one end thereof, as best seen in FIG. 2. Endplate 123 may include various coupling features. For example, protruding knobs 127 may be provided, which may be inserted within the distal ends of inflation conduits/tubes 140, which are discussed in greater detail below, to facilitate coupling of inflation conduits 140 and/or an inflation module 130 to the housing 120. Of course, this is but an example. It should be understood that other embodiments are contemplated in which the endplate 123 may be integrally formed with the housing 120.

Inflation module 130 may be coupled to the aspiration housing 120. In the depicted embodiment, an endcap may extend from and/or be coupled with aspiration housing 120 opposite from endplate 123. This endcap may comprise a plate portion 139 and an inflator hub portion 138 extending from the plate portion 139. Inflator hub portion 138 comprises threads 137, which are configured to allow a threaded cap 134 to be coupled therewith.

An inflator 132 is configured to be received in the cylindrical-shaped opening defined by inflator hub 138. Inflator 132 may, in some embodiments, comprise an inflator flange, which may be formed as a cylindrical ring or plate that extends about a proximal portion of inflator 132. In some embodiments, this may allow for inflator 132 to be coupled with the inflator hub 138 by a crimping operation, as disclosed in U.S. Patent Application Publication No. 2023/0398957 titled SYSTEMS AND METHODS FOR IMPROVED AIRBAG ASPIRATION, which is hereby incorporated herein by reference in its entirety. This crimping may be performed instead of providing threads 137 and threaded cap 134, or may be provided in addition to these coupling features. Of course, the inflator flange may simply be used to provide a backstop/stopping point to facilitate insertion of inflator 132 within inflator hub portion 138 without being used for such a crimping operation, if desired.

In preferred embodiments, inflation module 130 may be slidably coupled to the aspiration housing 120. For example, aspiration housing 120 comprises a pair of elongated channels configured to receive a corresponding pair of elongated rails, which may be formed along opposing sides of the outer inflation conduits 140. This may allow aspiration housing 120 and inflation module 130 to be slidably coupled to one another, in some embodiments without use of, or at least substantially without the use of, any fasteners.

Aspiration housing 120 may comprise a first or lower side comprising an aspiration inlet, as mentioned above, that may be configured to allow for receipt of ambient air into the airbag cushion 110 during inflation. This aspiration inlet may comprise a series of openings 122 (see FIGS. 4A and 4B) that may be defined along a lower surface and/or portion of housing 120 to allow for introduction of ambient air.

As shown in FIG. 1, the module/assembly 100 comprises a length L1 and a width W1 extending perpendicular to the length. Typically, the width W1 extends in a front-to-back direction of the vehicle within which the module/assembly 100 is positioned. By providing exterior coupling features such as protruding hooks 121, the width W1 may be substantially reduced, in some cases without sacrificing aspiration efficiency. For example, whereas current aspirating module widths are typically 115 mm in width or more, the width of some embodiments disclosed herein may be less than 100 mm, or in some cases no greater than about 85 mm.

As previously mentioned, inflation module 130 further comprises a plurality of inflation conduits 140, such as tubes, which are fluidly coupled with the inflator 132. Each of the inflation tubes 140 comprises a plurality of inflation or aspiration ports 142 (alternatively referred to as aspiration ports since they assist in drawing ambient air into the cushion 110 during inflation) and each of the inflation tubes 140 and/or ports 142 is configured to deliver inflation gas from the inflator 132 into the airbag cushion 110. Preferably, assembly 100 is configured such that the inflation gas is delivered at a sufficiently high velocity to draw ambient air through the aspiration inlet and into the airbag cushion 110 during inflation. In alternative embodiments, each of ports 142 may be formed on a nozzle or the like, which may extend from one or more of inflation conduits 140.

In the depicted embodiment, the inflation/aspiration ports 142 are formed within each respective inflation conduit 140 in two opposing rows along the conduit 140. These two rows are offset from one another relative to the center of each inflation conduit 140. In other words, if the center is measured perpendicular to the elongated axis of each inflation conduit 140, each of the ports 142 in one row is offset from the center towards a first side of the inflation conduit 140 (which may be adjacent to a first aspiration opening of the aspiration inlet in some embodiments), and each of the aspiration ports 142 in a second row of aspiration ports is offset from the center towards a second side of the same inflation conduit 140 opposite from the first side (and may be adjacent to another second aspiration opening of the aspiration inlet).

In addition, in some preferred embodiments, the ports 142 may also, or alternatively, be formed in rows that are staggered and/or offset relative to each other. In other words, along each respective conduit 140, the ports 142 along one row may be positioned such that, at any given cross-sectional position of a port 142 along the conduit 140, no port 142 from the other row is present, and vice versa. Thus, each row of ports 142 may be periodically spaced apart from one another within the row such that, at the location of any port 142 within the row, the opposite/other row of ports 142 has a non-ported location (or a position between adjacent ports 142) at this point along the axis of the conduit 140 that is in between adjacent ports 142, and vice versa. Further details regarding these ports/row configurations can be found in U.S. Patent Application Publication No. 2023/0398957 titled SYSTEMS AND METHODS FOR IMPROVED AIRBAG ASPIRATION, which was previously incorporated by reference.

In some embodiments, ports 142 may be angled outward away from the vertical direction, at least initially. In some such embodiments, the ports may be multi-faceted, multi-sectioned, and/or expanded in area from a proximal to distal direction. For example, angled surfaces, such as Prandtl-Meyer expansion angle surfaces, may direct the inflation gas from an initially outward direction to a vertical, or nearly vertical, direction to improve the efficiency of the aspiration of the adjacent, ambient air during deployment.

As shown in FIG. 2, assembly 100 may further comprise a valve assembly 160. Valve assembly 160 may comprise one or more valves preferably configured to automatically open upon actuation of the inflator and further configured to automatically close during inflation of the airbag cushion to prevent air and inflation gas from exiting through the aspiration inlet below the valve flaps of valve assembly 160. In some embodiments, the one or more valves of the valve assembly 160 may be configured to automatically close at a predetermined stage during inflation of the airbag cushion.

Figure 4A:
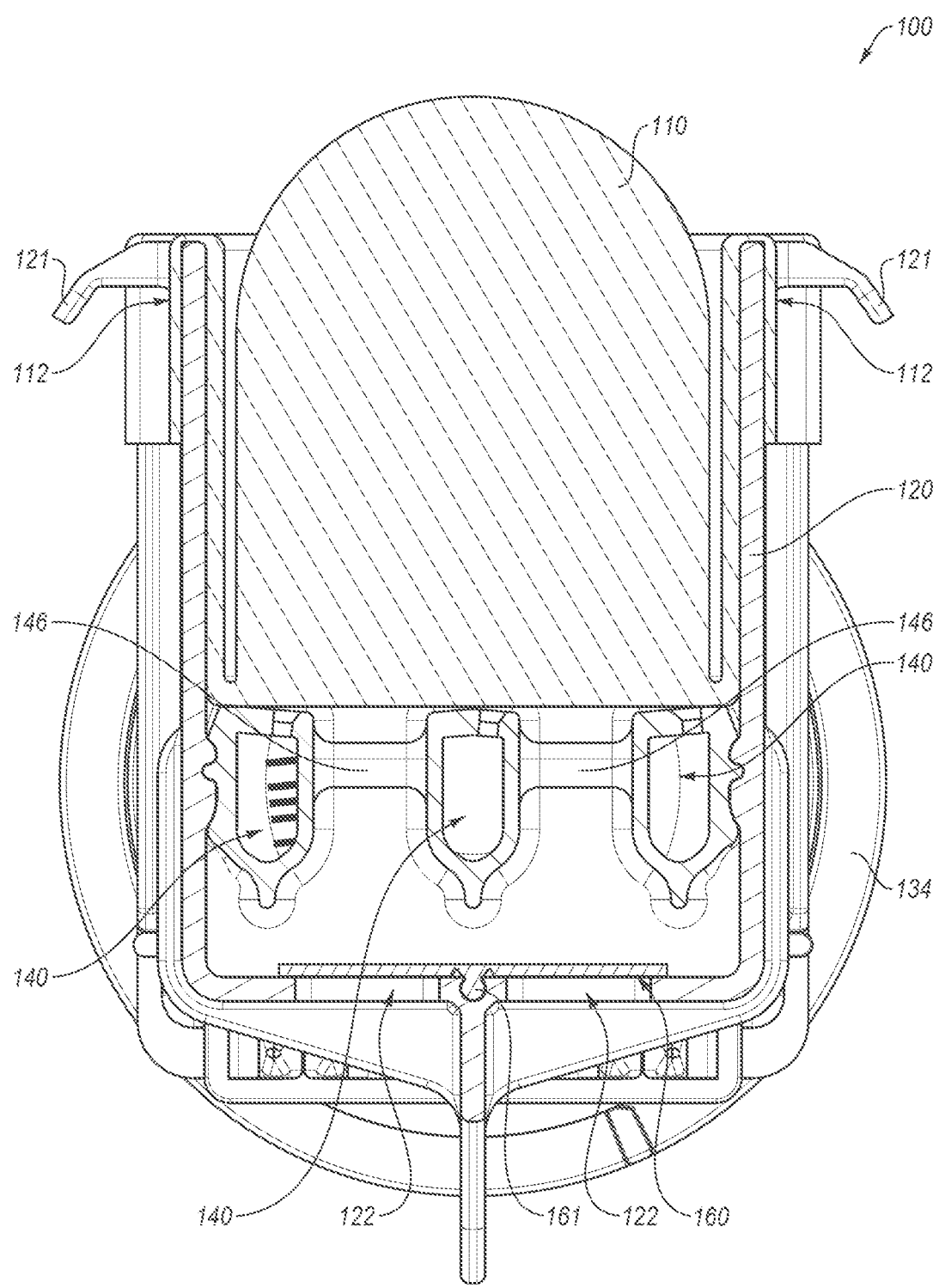
FIG. 4A is a cross-sectional view of the aspirating airbag assembly.
Figure 4B:
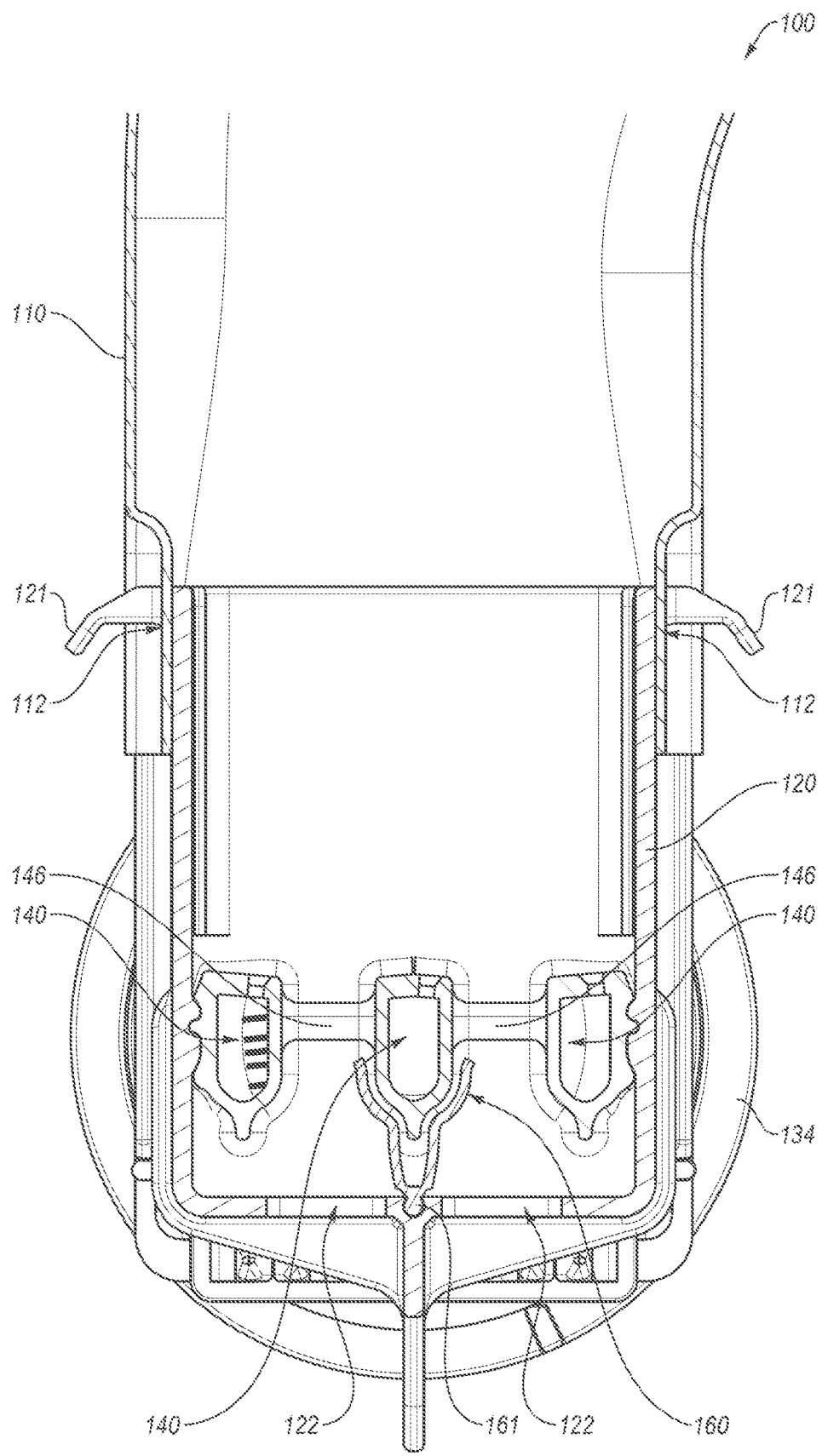
FIG. 4B is a cross-sectional view of the aspirating airbag assembly following deployment.

In the depicted embodiment, valve assembly 160 comprises a first valve or valve flap and a second valve or valve flap, as shown in FIG. 4B. These valves may comprise flaps, such as butterfly flaps, which are configured to automatically open and close at least two separate openings of the aspiration inlet. In some embodiments, including the depicted embodiment, these flaps may be configured to open and close each of the openings 122 defining the aspiration inlet. In the depicted embodiment, valve assembly 160 comprises two flaps that are pivotably coupled to one another at a central portion, such as hinge portion 161, of the respective valves. Thus, as shown in FIG. 4B, these two valves may be configured to pivot to their respective open configurations during inflation by pivoting their respective flaps at this central portion/line 161.

In some embodiments, the valve flaps of valves assembly 160 may be sufficiently flexible such that the flaps flex during inflation. In some embodiments, however, these flaps may be sufficiently rigid so as to maintain a bias towards their respective closed configurations. In other words, the valves and/or valve flaps may be configured to require force to open (generated by a partial vacuum within an associated airbag cushion) and are otherwise biased towards their respective closed configurations. Although the valve flaps themselves may be configured to perform this function alone in some embodiments, in other embodiments, a support member of such valve flaps, such as a spring-loaded hinge, may be provided to facilitate a desired opening and closing function.

In some embodiments, the valve flaps may comprise a relatively rigid material (at least compared to the fabric of airbag cushion 110). In some embodiments, such valve flaps may be configured to operate in a desired manner simply by rigidly coupling such flaps adjacent to the aspiration inlet. Alternatively, the valve flaps may be hinged at one end such that they are biased towards their respective closed positions. Some embodiments may comprise flaps that partially or fully overlap with one another.

Valve assembly 160 may, in some embodiments, also be slidably coupleable with aspiration housing 120. Thus, for example, a pivot point of the flaps of valve assembly 160 may comprise an elongated protrusion or bead 161, as shown in FIG. 4B (which shows the flaps of valve assembly 160 in an open configuration). This bead 161 may be slidably received within a corresponding, elongated slot formed along the lower portion of aspiration housing 120. Both protrusions/beads 161 and their corresponding slot preferably comprise a bulbous lower portion and a narrowed neck portion to ensure that valve assembly 160 is kept in its proper position within aspiration housing 120.

As previously mentioned, by directing high-velocity inflation gas through inflation ports 142, a pressure differential is generated that preferably results in the opening of the valves and/or flaps of valve assembly 160 automatically (i.e., without further mechanical elements or other forces/actions). This allows the inflation of airbag cushion 110 to be supplemented by ambient air, which may enter airbag cushion 110 through the one or more openings of the aspiration inlet. Preferably, inflation ports 142 may be used to generate a sufficient pressure differential to allow for the valve flaps to automatically open. This same pressure differential may then allow ambient air to assist with inflation of airbag cushion 110. Preferably, inflation gases are introduced in a high-speed and/or forceful manner into airbag cushion 110. Thus, in addition to and/or as an alternative to the pressure differential, the velocity and/or rate of volume of gas delivered through ports 142 may be sufficient to cause ambient air to be entrained within the inflation gas and therefore aspirated into airbag cushion 110 along with this inflation gas.

At a desired point during inflation, the valves and/or flaps of valve assembly 160 are preferably configured to automatically close to prevent the air and inflation gases from escaping, or at least reduce the amount of air and inflation gases that may escape from, airbag cushion 110. Again, this may be accomplished in a number of ways but, preferably, the valves and/or flaps of valve assembly 160 are biased, either by way of a hinge, by way of their physical makeup and coupling/pivot point(s) of attachment, or otherwise, towards their respective closed positions, preferably such that a threshold amount of force and/or pressure is required in order to reposition them to their open configurations, after which they automatically return to their closed configurations.

Thus, the valve(s)/flap(s) of valve assembly 160 are preferably configured to operate in a closed configuration initially, and then automatically open during inflation, which may be caused by generating a partial vacuum within the airbag cushion 110 by, for example, the inflation gas from an inflator. Following inflation, the system may be configured to automatically close again to maintain gases (both ambient air and inflation gas) in the cushion during occupant contact. The system may be specifically configured to provide for these three stages (closed, open during inflation, and re-closing during or following inflation) automatically at desired times by virtue of the positioning and configuration of the valve(s), conduits, ports, etc.

More specifically, upon initial deployment, there may be significant pressure achieved in the cushion 110 prior to the cushion 110 breaking through wrapper 115 and/or a cover (the "breakout phase" of the deployment). With this high pressure, the potential for leakage out the back of the housing is very high without blocking the aspiration inlet. Failure to block the aspiration inlet may also inhibit desired cushion restraint. Following the breakout phase, it is preferred that the aspiration inlet be opened as quickly as possible to allow for ambient air to assist in the inflation process.

Again, following the decrease of the pressure differential previously mentioned, a pressure differential developed in an opposite direction, and/or the cessation of inflation gasses being delivered through inflation ports 142, the valve flaps may be configured to automatically close again. As previously mentioned, in some embodiments, the valve flaps may be biased towards their respective closed positions to facilitate this stage of inflation.

Inflation module 130 may further comprise a frame defined by a plurality of support members, some of which may comprise cross-members 146 extending perpendicular to the inflation conduits 140. Additional support members may extend parallel to conduits 140 in some embodiments, if desired.

The aspiration inlet of housing 120 may comprise a plurality of openings aligned in a grid pattern along its lower side. However, it is contemplated that, in alternative embodiments, the aspiration inlet may comprise a single opening (in some such embodiments, the entire lower side of aspiration housing 120 may be open) or may comprise any other suitable number of openings as desired.

Figure 3:
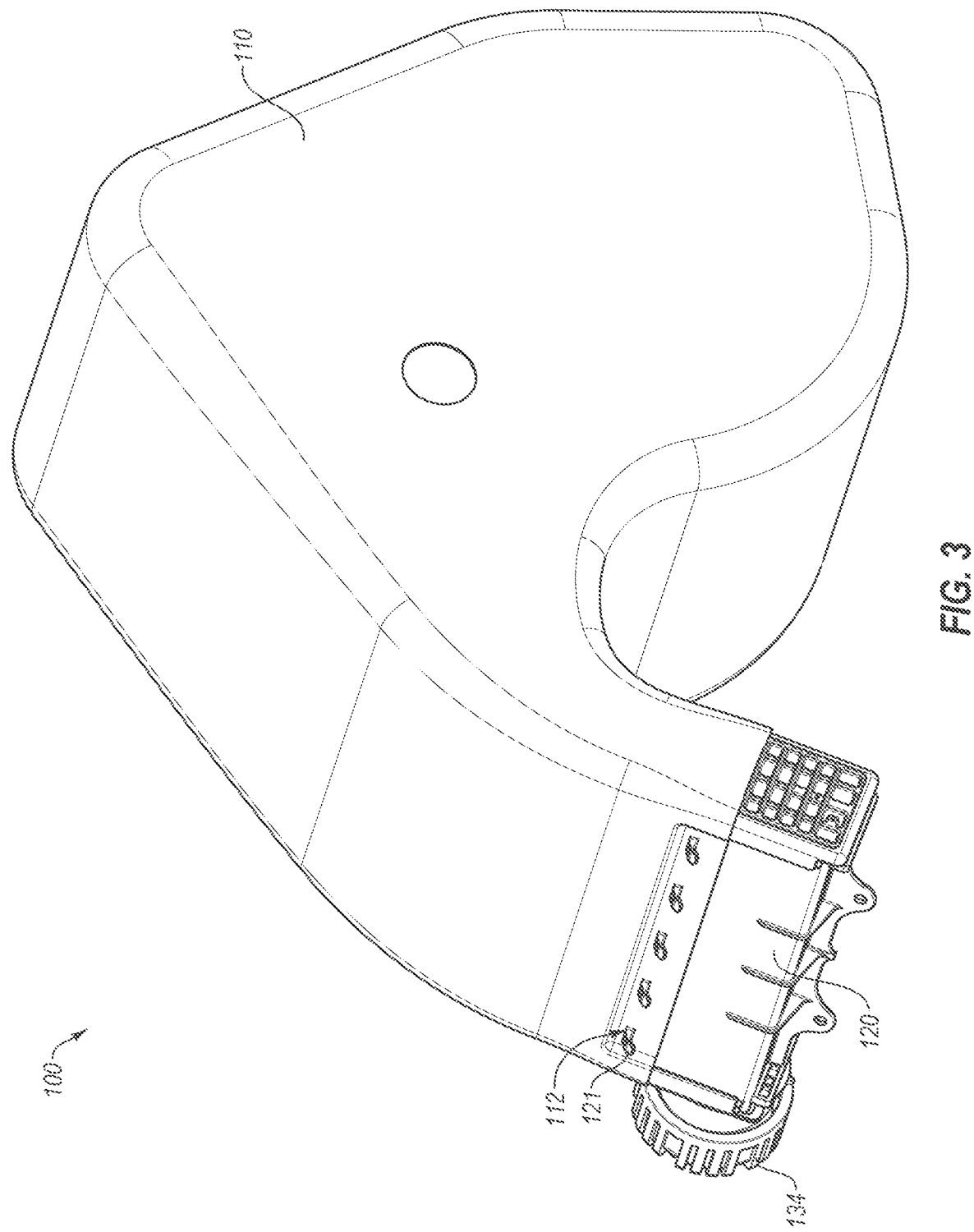
FIG. 3 depicts the aspirating airbag assembly following deployment.

FIG. 3 depicts assembly 100 following deployment. In this figure, it can be seen that cushion 110, after having been inflated through wrapper 115 and out of the compartment defined within, remains coupled with the outer surface of the housing 120. More particularly, cushion 110 is fixedly coupled with each of the plurality of hooks 121, which extend along both elongated sides of the housing 120. As also shown in this figure, the cushion 110 is wrapped about the full perimeter of the upper portion of the housing 120, due to the fact that engagement members/hooks 121 are used to couple the cushion with both opposing sides of the housing 120.

Although not shown in the depicted embodiment, it is contemplated that additional hooks or other engagement members and/or features may be provided at other locations, such as, for example, along one or both of the shorter sides/ends of the housing 120 that extend between the opposing elongated sides.

FIGS. 4A and 4B depict cross-sectional views of the assembly 100. More particularly, FIG. 4A depicts the assembly 100 prior to deployment and FIG. 4B during deployment.

As shown in FIG. 4A, the throat region of cushion 110 is inverted, folded against itself along the periphery of the housing 120 inside the chamber defined by the housing 120, and then folded again down over the periphery of the housing along the outside of the chamber so that each of the hooks 121 can extend through a corresponding slit 112, slot, or other opening formed along the periphery of the throat region of the cushion 110. Again, a variety of alternative means for fixedly coupling an airbag cushion to an exterior surface, and/or an exterior portion, of an airbag housing and/or module are contemplated, such as: recesses, grooves, adhesives, or other non-protruding coupling features (which may further comprise staples, screws, bolts, or other fasteners in some contemplated embodiments); or tabs, prongs, studs, or other protruding coupling members.

As shown in FIG. 4B, upon deployment of the inflator 132 (not shown in this figure), the flaps of valve assembly 160 open to allow ambient air to enter the cushion 110, which causes the cushion to unfold and expand out of the chamber defined by the housing 120. Due to the fixed coupling of the throat region of the cushion 110 along the upper portion of the outer surface of the housing 120, the cushion 110 is retained to the assembly/module 100 during inflation.

Figure 5:
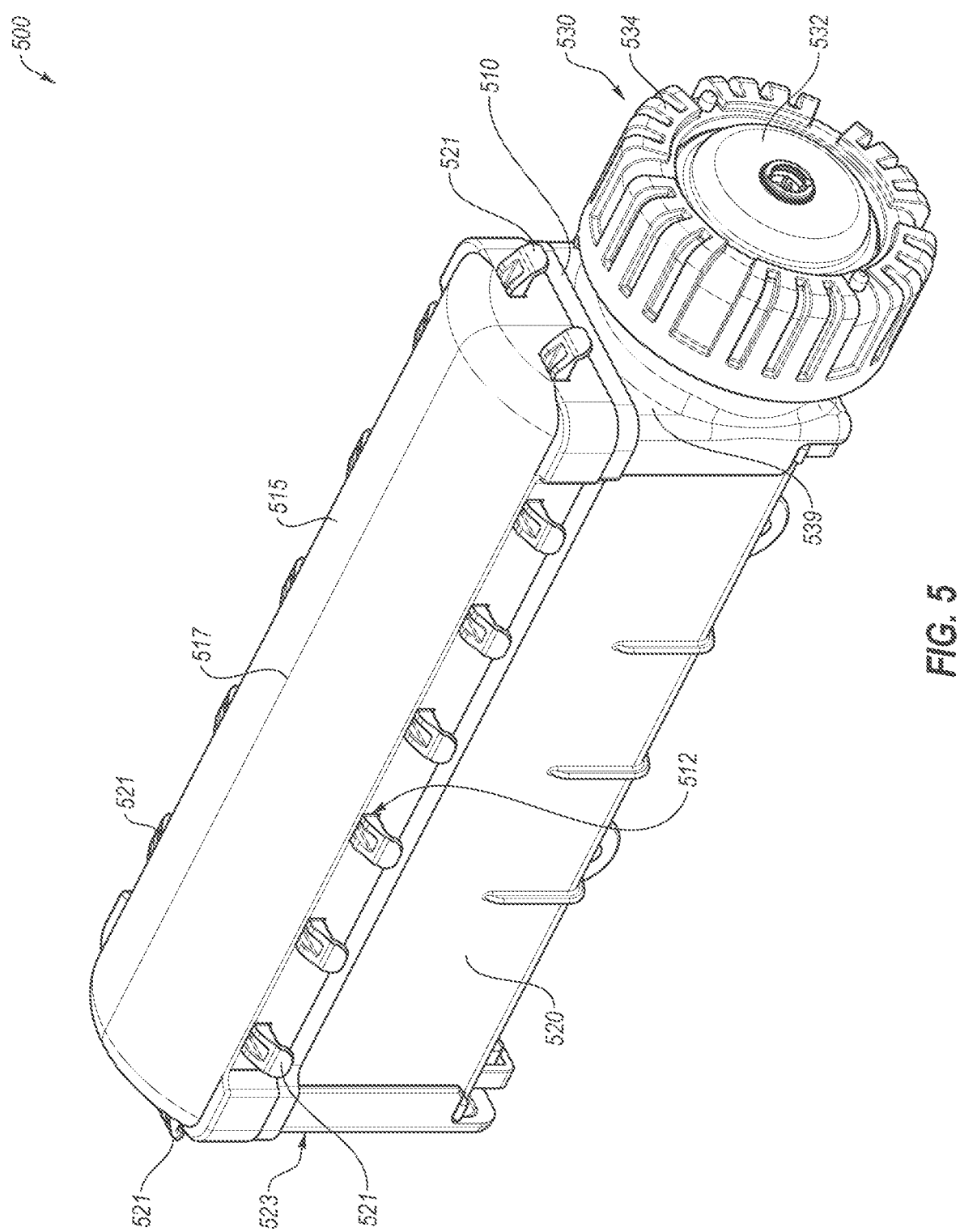
FIG. 5 is a perspective view of an aspirating airbag assembly according to other embodiments.

FIG. 5 depicts an alternative aspirating airbag cushion assembly 500. Aspirating airbag cushion assembly 500 again comprises an airbag cushion 510 coupled with an aspiration housing 520 so as to allow the cushion 510 to deploy therefrom. The aspiration housing 520 comprises an open upper end for receiving airbag cushion 510 and an aspiration inlet along the bottom that is configured to allow for receipt of ambient air into the airbag cushion during inflation.

Aspiration housing 520 further comprises one or more features that facilitate coupling with the airbag cushion 510 along an exterior surface of the housing 520. In the depicted embodiment, these features comprise protruding coupling members or hooks 521.

As previously mentioned, hooks 521 are also used to couple a peripheral edge of the airbag cushion 510 to an outer surface and/or portion of the aspiration housing 520 such that the airbag cushion 510 extends from an inner portion of the aspiration housing 520 to the outer portion and/or surface with a peripheral edge of the airbag cushion 510 being coupled with the housing 520 along the outer portion and/or surface.

A plurality of slits and/or openings 512 are also formed along a peripheral edge of the airbag cushion 510 to allow hooks 521 or other protruding coupling members to extend therethrough and allow the airbag cushion 510 to be fixedly coupled with the exterior portion and/or surface of the aspiration housing 520. However, unlike assembly 100, assembly 500 further comprises hooks 521 along both opposing ends of the assembly, namely, along endplate 523 and plate portion 539 of the opposing endcap.

Other features and/or components of assembly 500 may be similar or identical to those of assembly 100. For example, a wrapper 515 may be coupled with housing 520 to enclose the airbag cushion 510 thereunder, which may comprise a tear seam 517. Similarly, an inflation module 530 comprising an inflator 532 may be coupled to the aspiration housing 520 with a threaded cap 534.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An aspirating airbag cushion assembly, comprising:
   an airbag cushion;
   an inflator configured to draw ambient air into the airbag cushion upon deployment; and
   a housing configured to receive the airbag cushion therein,
      wherein the housing is further configured to allow for receipt of ambient air into the airbag cushion during inflation of the airbag cushion,
      wherein the housing comprises a plurality of coupling features protruding from an outer surface of the housing, wherein the plurality of coupling features comprises coupling hooks, and
      wherein a portion of the airbag cushion extends to the outer surface of the housing and couples with the plurality of coupling features.

2. The aspirating airbag cushion assembly of claim 1, wherein the coupling hooks are configured to facilitate coupling of the housing to a vehicle instrument panel.

3. The aspirating airbag cushion assembly of claim 1, wherein the housing comprises an elongated length defined by opposing sides of the housing and a width measured between the opposing sides of the housing, and wherein the width is no greater than about 85 mm.

4. The aspirating airbag cushion assembly of claim 1, wherein the housing comprises a length defined by opposing sides of the housing and a width measured between the opposing sides of the housing, and wherein the coupling features are formed along upper ends of both of the opposing sides of the housing.

5. The aspirating airbag cushion assembly of claim 4, wherein coupling features are also formed along at least one of a pair of opposing ends of the housing, wherein at least one of the opposing ends defines the width.

6. An airbag cushion assembly, comprising:
   a housing comprising an inner portion and an outer portion;
   an inflator fluidly coupled with the inner portion of the housing; and
   an airbag cushion stored in the housing, wherein the airbag cushion extends from the inner portion to the outer portion such that a peripheral edge of the airbag cushion is coupled with the housing along the outer portion,
      wherein the housing comprises a plurality of protruding coupling members, and wherein the peripheral edge of the airbag cushion is coupled with the plurality of protruding coupling members, wherein the plurality of protruding coupling members comprises coupling hooks, and wherein the airbag cushion comprises a plurality of slits configured to receive the plurality of coupling hooks.

7. The airbag cushion assembly of claim 6, wherein the airbag cushion assembly comprises an aspirating airbag cushion assembly, and wherein the housing is configured to allow for receipt of ambient air into the airbag cushion during inflation of the airbag cushion.

8. The airbag cushion assembly of claim 6, wherein the housing comprises opposing sidewalls defining an elongated length and opposing end walls defining a width measured between the opposing sidewalls of the housing, and wherein the inflator is coupled to one of the opposing end walls.

9. The airbag cushion assembly of claim 8, wherein the width is no greater than about 85 mm.

10. The airbag cushion assembly of claim 6, further comprising a wrapper extending along an upper side of the housing between the opposing sidewalls.

11. The airbag cushion assembly of claim 10, wherein the wrapper is coupled with the plurality of protruding coupling members.

12. An aspirating airbag cushion assembly, comprising:
   a housing comprising an inner portion and an outer portion, wherein a plurality of hooks extends along the outer portion, and wherein the plurality of hooks is configured to facilitate coupling of the housing within a vehicle;
   an inflator fluidly coupled with the inner portion of the housing; and
   an airbag cushion stored in the housing,
      wherein the housing is configured to allow for receipt of ambient air into the airbag cushion during inflation of the airbag cushion, and
      wherein the airbag cushion extends from the inner portion to the outer portion such that a peripheral edge of the airbag cushion is coupled with the plurality of hooks.

13. The airbag cushion assembly of claim 12, wherein the housing comprises a width extending between opposing sides of the housing, and wherein the width is no more than about 85 mm.

14. The airbag cushion assembly of claim 12, wherein each of at least a subset of the plurality of hooks extend along upper edges of opposing sides of the outer portion.

15. The airbag cushion assembly of claim 14, wherein at least some of the plurality of hooks further extend along at least one side of the housing extending between the opposing sides.

16. The airbag cushion assembly of claim 12, wherein the airbag cushion comprises a plurality of openings configured to receive the plurality of hooks therethrough.

17. The airbag cushion assembly of claim 12, further comprising a wrapper extending along an upper side of the housing, wherein the wrapper is coupled with the plurality of hooks, and wherein the wrapper comprises a tear seam to allow the airbag cushion to deploy therethrough.

\* \* \* \* \*